(12) United States Patent
Rosen et al.

(10) Patent No.: US 8,269,191 B2
(45) Date of Patent: Sep. 18, 2012

(54) SYSTEM AND METHOD FOR MEASURING DEPOLARIZATION

(75) Inventors: David Lawrence Rosen, Rockville, MD (US); Ronald Everett Meyers, Columbia, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 12/940,228

(22) Filed: Nov. 5, 2010

(65) Prior Publication Data

US 2012/0112093 A1 May 10, 2012

(51) Int. Cl.
*G01J 1/58* (2006.01)

(52) U.S. Cl. ............... 250/458.1; 250/459.1; 250/461.1; 250/252.1

(58) Field of Classification Search ............... 250/458.1, 250/459.1, 461.1, 252.1
See application file for complete search history.

(56) References Cited

U.S. PATENT DOCUMENTS

| | | | | |
|---|---|---|---|---|
| 4,548,499 | A * | 10/1985 | Eisert et al. | 356/318 |
| 5,847,394 | A * | 12/1998 | Alfano et al. | 250/341.8 |
| 6,696,299 | B1 * | 2/2004 | Empedocles et al. | 436/56 |
| 7,652,767 | B2 * | 1/2010 | Harsh et al. | 356/445 |
| 7,872,243 | B2 * | 1/2011 | Trinquet et al. | 250/458.1 |
| 2008/0318266 | A1 * | 12/2008 | Cullum et al. | 435/29 |
| 2009/0189074 | A1 * | 7/2009 | Bello | 250/301 |
| 2011/0272584 | A1 * | 11/2011 | Zhang et al. | 250/340 |

OTHER PUBLICATIONS

Ivanov et al., Impact of emission Anisotropy on Fluorescence Spectroscopy and FRET Distance Measurements, Aug. 2009, Biophysical Journal, vol. 97, pp. 922-929.*
Miyazaki, D., et al. "Transparent Surface Modeling from a Pair of Polarization Images," IEEE Transactions on Pattern Analysis and Machine Intelligence, vol. 26, No. 1, Jan. 2004., pp. 783-782.
Driscoll, W.G., Handbook of Optics, McGraw-Hill Book Co., (1978) pp. 14-1, 14-2, 14-39, 14-52 to 14-58, and 15-1 to 15-9.
Grant R. Fowles, "Introduction to Modern Optics," 2nd Ed. (Holt, Rheinhart, and Winston, 1975) pp. 43-46.
Nayar, S.K., et al. "Generalization of the Lambertian model and implications for machine vision," International Journal of Computer Vision, vol. 14, pp. 227-251, 1995.
Westlund, Harold B. The Role of Rendering in the Competence Project in Measurement Science for Optical Reflection and Scattering, n J. Res. Natl. Inst. Stand. Techno!. 107, 247-259 (2002).
Alison Rodger and Bengt Norden, "Circular Dichroism and Linear Dichroism" (Oxford, 1997) pp. 45-89.

(Continued)

*Primary Examiner* — Christine Sung
(74) *Attorney, Agent, or Firm* — Lawrence E. Anderson

(57) ABSTRACT

An apparatus for determining the depolarization efficiency of a environment includes a transmitter, a receiver, and signal processing circuitry. A reference object is located within the environment at a reference distance. The transmitter includes a radiation source providing incident radiation that has an initial polarization as it enters the environment. The receiver receives returned radiation from the reference, which may be diffuse reflection or photoluminescence. The signal processing circuitry calculates the depolarization efficiency of the environment from the initial polarization, luminescence or final polarization, and the reference distance. A method of determining depolarization efficiency includes directing incident radiation having initial polarization through an environment onto a reference, detecting returned radiation from the reference, and calculating the depolarization efficiency using the initial polarization and the luminescence or final polarization.

18 Claims, 2 Drawing Sheets

OTHER PUBLICATIONS

G.P. Gobbi, F. Barnaba, M. Blumthaler, G. Labow, and J.R. Herman, "Observed effects of particles nonsphericity on retrieval of marine and desert dust aerosol optical depth by lidar," Atmospheric Research 61, 1-14 (2002).

Mishchenko, Michael, Scattering, Absorption, and Emission of Light by Small Particles (Cambridge, 2002) pp. 8-30.

Smith, Matthew, et al., "Multispectral infrared Stokes imaging polarimeter" (Proceedings Paper) in Polarization Measurement, Analysis, and Remote Sensing, ed. D. H. Goldstein and D. B. Renault Proceedings of SPIE V. 3754 (1999).

Smith, Matthew, et al., "Beam Wander Considerations in Imaging Polarimetry," in Polarization: Measurement, Analysis, and Remote Sensing II, D. H. Goldstein, D. B. Chenault, eds., Proceedings of SPIE 3754, 50-54 (1999).

Shaw, Joseph, "Degree of linear polarization in spectral radiances from water-viewing infrared radiometers," Appl. Opt. 38(15), 3157-3165 (1999).

Obukhov, A.M., et al. Polarization of the Twilight Sky: Measurements, Empirical Model, Radiative Transfer Simulation and Application to Aerosol Profile Retrieval, II ovp@omega.ifaran.ru. ugol@tanatos.asc.rssi.ru (2003).

Swap, Robert R., "Africa burning: a thematic analysis of Southern African Regional Science Initiative-SAFARI," J. Geophys. Res. submitted (2003).

Shaw, Joseph A. "Polarized infrared emissivity for a rough water surface," Opt. Exp. 7, 25342 (2000).

Acharya, K. et al. "MODTRAN4: Multiple Scattering and Bi-Directional Reflectance Distribution Function (BRDF) Upgrades to MODTRAN," SPIE Proc. 3756,1-9 (1999).

Berk, A. "MODTRAN Radiative transfer modelling for atmospheric correction," JPL Report 1-7 (1999) paper was published in the SPIE Proceeding, Optical Spectroscopic Techniques and Instrumentation for Atmospheric and Space Research III, vol. 3756, Jul. 1999.

Meyers, Jason, "Modeling Polarimetric Imaging using DIRSIG", RIT Imaging Science Ph.D. thesis (Chester F. Carlson Center for Imaging Science Rochester Institute of Technology, 2002).

Kim, A.D. et al. "Influence of the relative refractive index on the depolarization of multiply scattered waves," Physical Review E, vol. 64, 026612 published Jul. 24, 2001.

Lu, S-Y, "Interpretation of Mueller matrices based on polar decomposition," J. Opt. Soc. Am. A/vol. 13, No. 5/May 1996 p. 1106.

Pierre-Yves Gerligand, et al. "Polarimetric images of a cone," Optics Express 420-430 (1999).

Chipman, Russell, "Polarization analysis of Optical Systems," Optical Engineering 28, 090-099 (1989).

Meyers, Jason, P. et al. "Incorporation of polarization into DIRSIG synthetic image generation model," SPIE 4816,132-143 (2002).

Kenneth K. Ellis, "Polarimetric bidirectional reflectance distribution function of glossy coatings," J.Opt.Soc.Am. 13, 1758-1762 (1996).

Karavas, Panagiotis "Validation/Evaluation of Polarization Version of SEARAD," MS thesis (Hellenic Naval Academy, 1999).

Lagarass, Spiridan, Modeled Detection and Recognition Range for a Polarization Filtered FLIR Sensor, (MS thesis, Helenic Naval Academy, 1999).

Yong, Tan C., "An Infrared Model of R/V Point SUR Using EOPACE Data," Report A156163 (Naval Postgraduate School, 1999).

Cooper, W.A., "Infrared polarization measurements of ship signatures and background contrast" (Proceedings Paper) SPIE 2223, 300-309 (1994).

Burton, Robin, et al, "Elastic LADAR Modeling for Synthetic Imaging Applications," SPIE, vol. 23, No. 13, pp. 144-155 (2002).

Lentilucci, Emmerr J. et al. "Advances in Wide Area Hyperspectral Image Simulation,"presented at SPIE AeroSense 2003, SPIE vol. 5075-13 (2003).

Arnold, Peter S. "Hyperspectral Simulation of Chemical Weapons Dispersal Patterns in DIRSIG" (Digital Imaging and Remote SensingLab, Rochester Institute of Technology, 2003).

"Nonconventional Exploitation Factors (NEF) Modeling," Computer Graphic Rendering of Material Surfaces,Website http://math.nist.gov/~FHunt/appearance/nefds.html (est. 2003).

Merino, 0scar Gonzalez "Image analysis of Infrared Polarization measurements of landmines," (Vrije Universiteit Brussel, Universitat Politecnica, De Catalunya)(Masters Thesis 2001).

Rogne, Timothy J. "Passive Target Detection using Polarized Components of Infrared Signatures," SPIE 1317, 242-251(1990).

Sadjadi, Firooz A. Application of a Passive Polarimetric Infrared Sensor in Improved Detection and Classification of Targets, II International Journal of Infrared and Millimeter Waves 19, 1541-1559 (1998).

Sadjadi, Firooz A. "Automatic target recognition using polarization-sensitive thermal imaging," Proc. SPIE 2485, 353 (1995); doi:10.1117/12.213102.

W. de Jong, et al. "Usage of polarization features of landmines for improved automatic detection," Proc. SPIE 4038, 241-252 (2000).

Cremer, Frank "Infrared polarization measurements and modeling applied to surface-laid antipersonnel landmines," Opt. Eng. 41, 1021 (2002); doi:10.1117/1.1467362.

Schechner, Yoav Y."Polarization-based vision through haze," AppL Opt. vol. 42, No. 3, 511-525 (Jan. 20, 2003).

Schmitt, J.M. "Use of polarized light to discriminate short-path phtons in a multiply scattering medium," AppL Opt. 31 (#30) 6535-6546 (Oct. 20, 1992).

Tooley, Richard D. "Man-made detection using infrared polarization," SPIE 1166, 52-58 (1989).

Westlund Harold B, et al. "A BRDF Database Employing the BeardMaxwell Reflection Model," (University of Oregon) accessed Jul. 21, 2003).

Koenderink, J..J. "Bidirectional reflection distribution function expressed in terms of surface scattering modes," ECCV '96. 4th European Conference on Computer Vision Proceedings, vol. 2, pp. 28-39.

Priest, Richard G. et al., "Polarimetric BRDF in the Microfacet Model," Proceedings of the 2000 Meeting of the Military Sensing Symposia Specialty Group on Passive Sensors: Theory and Measurements,I, 169-181 (2000).

Kato, Seiji et al. "A Comparison of Modeled and Measured Surface Shortwave Irradiance for a Molecular Atmosphere", J. Quant. Spectrosc. Radiat. Transfer Vo!' 61, 493-502 (1999).

Smith, Warren J. "Modern Optical Engineering" ed. 3 (McGraw-Hill, 2000) p. 200.

Germer, Thomas, et al. "Modeling the appearance of special effect pigment coatings," SPIE 4447, 77-86 (2001).

Vosilla, John ,"Northrop Grumman's E-2C Marks Successful First Live-Fire Test of Ballistic Missile Sensor," Northrop Grumman Press Release (Aug. 20, 2001).

Ackenhusen, L. "Infrared/Hyperspectral Methods" [for Landmine Detection}, in Alternatives for Landmine Detection (White House Office of Science and Technology Policy and Rand Science and Technology Policy Institute, to appear Mar. 2003)pp. III-125.

Hackwell, J.A., et al. "LWIR/MWIR Imaging Hyperspectral Sensor for Airborne and Ground-Based Remote Sensing," SPIE Proceedings, vol. 2819, 1996.

Lacombe, "Environmental Influences of Thermal Signatures of Buried Land Mines," U.S. Army, Fact Sheet, Apr. 1999.

Michael J. Rigo, Hyperspectral Polarimetry for Satellite Remote Sensing, United States Naval Academy Thesis (1998) (Abstract only).

Ellias, T. et al. "Exploring the Potential of Combining Column Integrated Atmospheric Polarization with Airborne in situ size Distribution Measurements for the Retrieval of an Aerosol Model: a Case Study of a Biomass Burning Plume during SAFARI 2000." J. Geophys. Res., vol. 108 No. D13 Date: Jul. 16, 2003 pp. SAF44-1-16.

Coulson, Kinsell L., Polarization and Intensity of Light in the Atmosphere (A. Deepak Publishing, Hampton, VA 1988) pp. 272-291.

Unmanned Aerial Vehicle Roadmap 2000-2025, Office of the Secretary of Defense, dated Apr. 2001, pp. 26-29.

Koenderink, Jan J., "Bidirectional Reflection Distribution Function Expressed in Terms of Surface Scattering Modes," ECCV '96. 4th European Conference on Computer Vision Proceedings, vol. 2, p. 28-39 (1996).

Mishchenko, M., et al., "Light Scattering by Nonspherical Particles, Theory, Measurements and Applications" Academic Press, 2000, pp. 393-416.

Baertlein, B. "Infrared/Hyperspectral Methods" (Paper I) RAND Report MR1608, Ohio State University p. 93-110 (2003) www.rand.org/publications/MR/MR1608/MR1608.appc.pdf.

A. Rogalski and K. Chrzanowski, "Infrared Devices and Techniques" Infrared Handbook of Optoelectronics (Two-Volume Set) Edited by Robert G . W . Brown and John P Dakin Taylor & Francis 2006 pp. 653-692.

Saleh, B.E. Fundamentals of Photonics (Wiley, 1991) p. 205.

John David Jackson, Classical Electrodynamics 3rd Ed. (Wiley, 1999) pp. 300-306.

Lee, Raymond "Digital imaging of clear-sky polarization," Appl. Opt. 37, 1465-1476 (1998).

Howe, James D "Polarization sensing for target acquisition and mine detection," SPIE 4133, 202-213 (2000).

Hoffmann, A., et al. "Ground-based lidar measurements from Ny-A° lesund during ASTAR 2007: a statistical overview," Atmos. Chem. Phys. Discuss. 9, 15453-15510, (2009).www.atmos-chem-phys-discuss.net/9/15453/2009/.

Miyazaki et al., "Determining surface orientations of transparent objects based on polarization degrees in visible and infrared wavelengths,"vol. 19, No. 4/J. Opt. Soc. Am. A p. 687-694 (Apr. 2002).

Cremer, et al., "Infrared polarisation measurements of surface and buried anti-personnel landmines,"Proceedings of SPIE vol. 4394, p. 164-175 (2001).

Diner, D., et al., "Multi-angle Imaging SpectroRadiometer (MISR) Instrument Description and Experiment Overview," IEEE Transactions on Geoscienceand Remote Sensing, 36(#4) 1072-1087 (Jul. 1998).

Fatale, et al., "New Initiatives in Natural Environmental Characterization for the Objective Force," United States Military Academy, 1-2 (Sep. 4, 2003).

Horn, et al., "Determining Optical Flow" MIT Artificial Intelligence Laboratory Memo, 572, 1-27 (1980).

McKinley, C., "When the Enemy Has Our Eyes," School of Advanced Power Studies (Jun. 1996).

Narasimhan et al. "Contrast Restoration of Weather Degraded Images" IEEE Transactions on Pattern Analysis and Machine Intelligence, vol. 25, 713-724, 2003.

Preetham et al. "A Practical Analytic Model for Daylight. Computer Graphics" Proceedings of SIGGRAPH 1999, 91-100 (Aug. 1999).

Preetham "Modeling Skylight and Aerial Perspective" www.atLcomJdeveloperISfGGRAPH03fPreethamSig2003CourseNotes.pdf. accessed Sep. 5, 2003.

Siegal et af. "Just Enough Reality: Comfortable 3-D Viewing via Microstereopsis" IEEE Transactions on Circuits and Systems for Video Technology 10(3), 387-396 (Apr. 2000).

JoséR. A. Torreão and Joaão L. Fernandes "Matching photometric-stereo images" J. Opt. Soc. Am. A/ vol. 15, No. 12/ -p. 2966-2975 (Dec. 1998).

JoséR. A. Torreão, "Natural Photometric Stereo?" Anais do IX SIBGRAPI, outubro de 1996.

Yu, Yizhou, et al. "Recovering Photometric Properties of Architectural Scenes From Photographs," SIGGRAPH '98 Proceedings of the 25th annual conference on Computer graphics and interactive techniques ACM New York, NY, USA ©1998 ISBN:0-89791-999-8 doi>10.1145/280814.280874 pp. 207-217 (1998).

Gian Paolo Gobbi, et al.,"Altitude-resolved properties of a Saharan dust event over the Mediterranean," Atmospheric Environment 34, 5119-5127 (2000).

M. A. Jones and P. W. Bohn, "Total Internal Reflection Fluorescence and Electrocapillary Investigations of Adsorption at the Water-Dichloroethane Electrochemical Interface: Fluorescence-Detected Linear Dichroism Investigation of Adsorption-Driven Reorientation of Di-N-butylaminonaphthylethenylpyridiniumpropylsulfonate," J. Phys. Chem. B 105, 2197-2204 (2001).

Paul L. Edmiston, et al., "Dipole Orientation Distributions in Langmuir-Blodgett Films by Planar Waveguide Linear Dichroism and Fluorescence Anisotropy," J. Phys. Chern. 100,775-7784 (1996).

Lee. R. Moyer, "Counter Concealed Target Technologies," DARPATech2000 (6-S Sep. 2000 )www.darpa.mil/darpatech2000 IPresentations ISPO-pdfl 4MoyerCCTB& W. pdf.

Tianshu Liu, "Geometric, Kinematic and Radiometric Aspects of Image-Based Measurement," AIAA 2002-3239, (22nd AIAA Aerodynamic Measurement Technology and Ground Testing Conference Jun. 24-26, 2002) p. 16.

Michael I. Mishchenko, Larry D. Travis, Andrew A. Lads, Scattering, Absorption, and Emission of Light by Small Particles (Cambridge, 2002) p. 100.

Matt Young, Optics and Lasers (Springer, 1977) pp. 43-72.

John David Jackson, Classical Electrodynamics 3rd Ed. (Wiley, 1999) pp. 305-306.

C.S.L. Chun, et al., "Polarization-Sensitive Thermal Imaging Sensors for Target Discrimination,"SPIE Conference on Targets and Backgrounds:Characterization and Representation IV • Orlando, Florida, SPIE vol. 3375, pp. 326-336 (Apr. 1998).

* cited by examiner

SYSTEM AND METHOD FOR MEASURING DEPOLARIZATION

GOVERNMENT INTEREST

The invention described herein may be manufactured, used, and licensed by or for the United States Government.

CROSS REFERENCE TO RELATED APPLICATIONS

This application is related to application Ser. No. 12/940,240 entitled "SYSTEM AND METHOD FOR DETERMINING THREE-DIMENSIONAL INFORMATION FROM TWO-DIMENSIONAL IMAGES," invented by Ronald Meyers, David Rosen, and Keith Deacon, and application Ser. No. 12/940,204 entitled "SYSTEM AND METHOD FOR DETERMINING THREE-DIMENSIONAL INFORMATION FROM PHOTOEMISSION INTENSITY DATA," invented by Ronald Meyers and David Rosen, both of which are filed on even date herewith and hereby incorporated by reference.

FIELD OF THE INVENTION

The present invention relates to methods and apparatus to determine the depolarization of electromagnetic waves passing through an environment.

BACKGROUND OF THE INVENTION

The present invention relates to the determination of the depolarization efficiency of the atmosphere, using the dependence of photoexcited emission (photoluminescence emission, Raman scatter, or diffuse reflection) of a reference object. Raman scattering is the inelastic scattering of a photon. When light is scattered from an atom or molecule, most photons are elastically scattered (Rayleigh scattering), such that the scattered photons have the same energy (frequency) and wavelength as the incident photons. However, a small fraction of the scattered light (approximately 1 in 10 million photons) is scattered by an excitation, with the scattered photons having a frequency different from, and usually lower than, the frequency of the incident photons. In a gas, Raman scattering can occur with a change in vibrational, rotational or electronic energy of a molecule (see energy level). Chemists are concerned primarily with the vibrational Raman Effect. Depolarization efficiency is the fractional change in degree of polarization per unit length for electromagnetic radiation propagating through an environment, such as the atmosphere. Measurement of depolarization efficiency would improve imaging of remote objects through environments. The environments include atmospheric environments and underwater environments.

Depolarization of scattered laser radiation has been measured remotely using depolarization lidar. Depolarization lidar has been used to study nonspherical dust particles in the atmosphere, and multiscattering in clouds. In depolarization lidar measurements, a laser beam is emitted from the lidar system, passes through the atmosphere, backscatters off an atmospheric particle, and passes through the atmosphere again, and is collected in a detection device in the lidar which determines its polarization state. The scattering processes that affect the depolarization measured by lidar include both forward scattering processes and backscattering processes. However, the radiation that comes back to the lidar system has to be backscattered from an atmospheric particle at least once, and the impact of this single scattering process may or may not be greater than the forward scattering processes that depolarize the laser beam. The depolarization of radiation in the atmosphere biases polarimetric sensors. The application of depolarization lidar would be extended if the forward and backward scattering processes could be separately determined.

Some methods that may discriminate forward scattering processes from backscattering process requires either a one way path for the laser beam or a well characterized reflector a known distance from the laser and receiver. Both types of measurements are biased by receivers more sensitive to one polarization state over the others.

One way methods have the disadvantage that both receiver and transmitter must be at a large distance from each other. Methods where the receiver and the laser are near each other have required a well characterized reflector and a known distance from the reflector. Well characterized types of reflector include retroreflector and dielectric mirror. However, reflectors often have a bias for one polarization or the other because of their intrinsic birefringence. Birefringence is the decomposition of a ray of light into two rays (the ordinary ray and the extraordinary ray) when it passes through certain types of material.

Thus, there exists a need for a method of measuring the polarization state of the laser beam unbiased by receiver and by reflector would be convenient for depolarization studies near the ground. For example, the capability of distinguishing forward from backward scattering could be very useful in distinguishing the scattering of nonspherical dust particles from multiscattering of water droplets. There also exists a need for the ability to measure the forward scatter of a transmitter beam independently of the backscatter in real-world environments.

SUMMARY OF THE INVENTION

A technique is provided that uses a photoexcited emitter (i.e., photoluminescent or Raman scattering material) with specular reflection to replace the reflector in methods where the laser and reflector are near each other. One advantage provided over conventional depolarization methods is that the photoemitted radiation is almost completely randomized. Therefore, the polarization bias of the receiver cannot impact the measurements. Another advantage is that the photoemission radiance of the photoemitter can be varied with incident polarization without an optical element. Therefore, optical elements that may have an uncharacterized birefringence are not required at the target.

An apparatus for determining the depolarization efficiency of an environment is provided, where the environment is the atmosphere or water, and includes a transmitter, a receiver, and signal processing circuitry, for example, a computer. A reference object, or reference, is located within the environment at a reference distance from the apparatus. The transmitter includes a radiation source, such as a laser, providing incident radiation that is directed to an incidence point on a reference. The incident radiation has an initial polarization as it enters the environment, and the returned radiation photoemission radiance that varies with the polarization state of the transmitter beam near the target and just before it is incident on the reference. The transmitter illustratively includes a laser or lamp source inclusive of a polarizer or polarization modulator, and, optionally, a filter that selectively transmits incident radiation. The receiver receives returned radiation from the reference, and determines the radiance of the photoexcited radiation. The receiver includes a detector, such as a camera, and may also include an analyzer and a filter that selectively transmits the returned radiation of interest. The returned radiation may be diffuse reflection, in which case the receiver may require a polarizer to filter out the specular reflection. The returned radiation may be photoluminescence (including fluorescence) or Raman scattering, and optionally has a wavelength significantly different from the incident radiation. In this case, the receiver optionally includes a filter that transmits the photoluminescence while blocking radiation at the incident radiation wavelength. The shape and optical properties of the reference object are known, the distance between source/ receiver system, and reference object are known, but the depolarization strength of the environment between source/receiver system and reference object are unknown and must be calculated.

The signal processing circuitry, such as a computer, is able to calculate the depolarization efficiency of the environment from the initial polarization, final polarization, and the reference distance. The circuitry receives detector data from the detector, the detector data being correlated with the intensity of returned radiation. The apparatus optionally includes timing electronics, to allow detector data to be correlated with initial polarization, the timing electronics being in electronic communication with the polarization modulator and with the detector. The apparatus may receive the reference distance from an associated device with which the apparatus is in communication.

The reference is already present within the environment, or may be introduced for inventive purpose. In one example, an asphalt road could be a photoluminescent target that is already in the environment. In a second example, a plastic target of known shape and composition could be introduced in the environment as a target for atmospheric studies. In either case, the shape and orientation of the target is what makes the intensity of emission dependent on transmitter polarization state. The depolarization strength of the medium can be determined using the object distance, the initial polarization of the incident radiation, the orientation and shape of the object, and the variation of the radiance of the received radiation with the polarization of the transmitted radiation.

DESCRIPTION OF THE PREFERRED EMBODIMENTS

Figure 1:
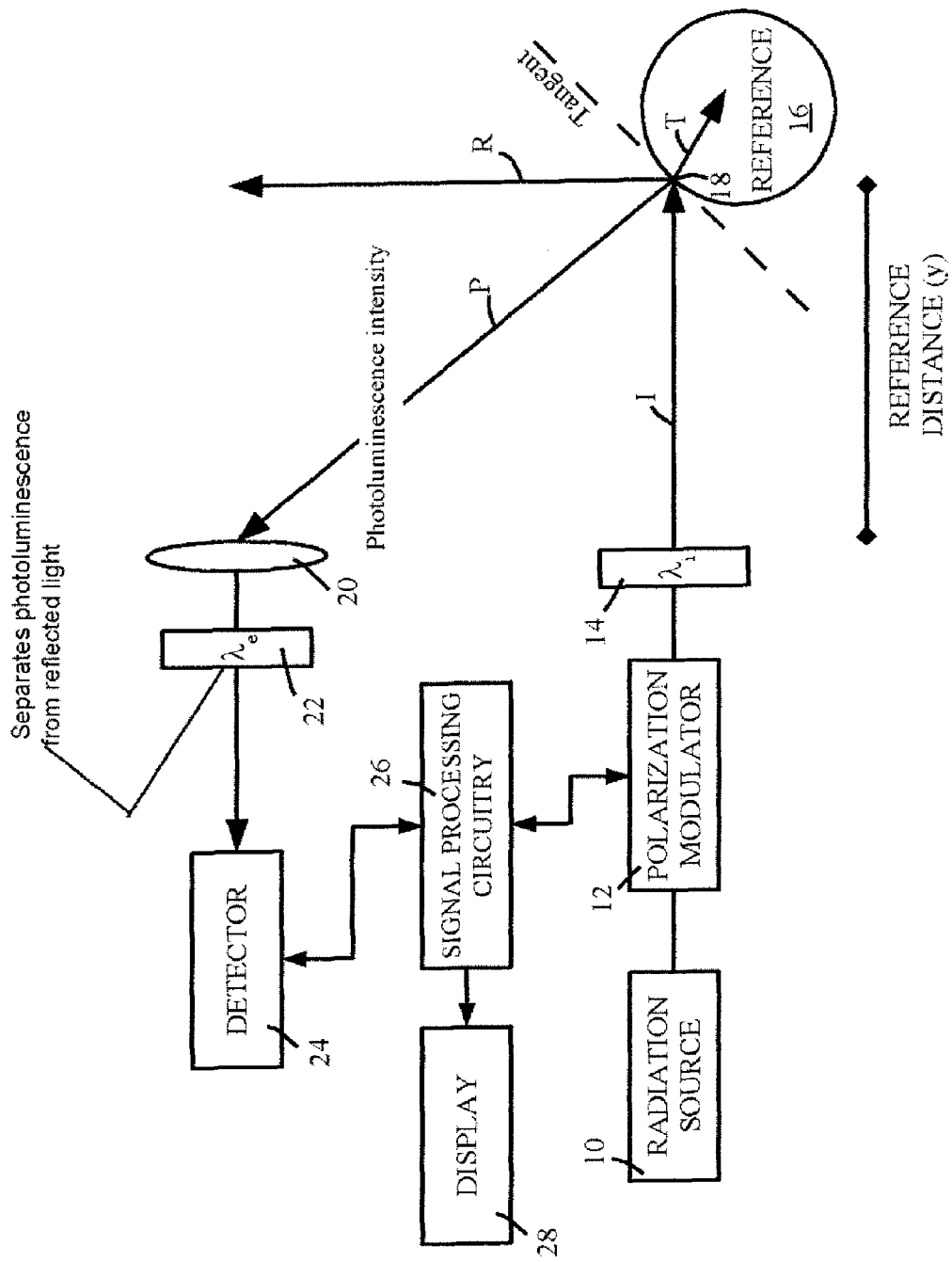
FIG. 1 shows a schematic of an apparatus used to determine depolarization efficiency of an environment using photoluminescence measurements and temporal variations in receiver intensity.

The present invention has utility as part of a remote imaging method, enabling the remote imaging method to compensate for image distortion associated with light passing through a distorting environment. A method is provided according to the present invention for measuring depolarization efficiency using a polarimetric stereo approach. A volumetric (i.e., three-dimensional) object with known properties is acquired as a reference object (or reference), illuminated with an electromagnetic radiation source that is completely polarized and at a known distance from the reference, and imaged using either photoluminescence or diffuse reflectance from the reference. The variations in radiance intensity at the receiver is measured and correlated to the polarization of the electromagnetic source. From the variations of emission radiance at the receiver, the degree of depolarization between the electromagnetic source and the receiver can be calculated using the correlation. The depolarization efficiency is the fraction of polarized radiation depolarized in a unit distance.

An inventive method also is provided that uses the variations in pixel intensity to calculate the depolarization without any temporal variation of laser polarization. The detector is a camera, where the intensity of received radiation is measured at each pixel. The polarization-averaged intensity at each pixel is proportionate to the depolarization of the object at each corresponding object point, where the transmittance at each object point is a function of both the polarization state of the incident radiation at the object surface and the angle of incidence at that object point. The three-dimensional shape of the target is known, so the depolarization of the surface of the reference-object can be calculated at each point. The variations in radiance intensity at each pixel of the receiver is measured and correlated to the polarization of the electromagnetic source. The depolarization can be calculated by dividing the measured polarization of the return radiation by the depolarization of the surface. The distance-averaged depolarization efficiency of the atmosphere between the object and the radiation source is found from the difference in degree of polarization between the radiation source and the object surface, divided by the distance to the reference.

The geometric shape of the reference can be chosen to present a curved surface, such as a circular cross-section, to the incident light source. For example, the reference can be a cylinder. For a cylindrical reference, the radiance values along the axis vary less with polarization than radiance values around the circumference. The composition, at least of a surface layer of the reference, can be chosen to present desired optical properties, such as photoluminescence or diffuse reflection, as described in more detail below.

An exemplary inventive apparatus for determining the depolarization efficiency of an environment includes a transmitter, inclusive of a radiation source that provides the incident radiation, and a receiver, inclusive of a radiation detector. The radiation detector is optionally a laser, and the transmitter optionally includes a polarizer (a fixed polarizer or polarization modulator), and the transmitter optionally includes a camera and an analyzer. An exemplary analyzer includes a fixed polarizer with a polarization transmission detection orthogonal to that of a fixed polarizer in the transmitter.

Apparatus and methods according to the present invention are readily used to determine the depolarization efficiency of an environment in which the reference is located. The incident radiation passes through the environment on the way to the object. Determination of environmental depolarization efficiency is critical to improving remote object imaging and tracking through the environment and as such has applications in satellite, atmospheric, and oceanographic imaging. In the case where the environment is the atmosphere, the incident radiation is depolarized by atmospheric particles. Therefore, if the shape of the reference is known independently of the photoluminescent image, then the depolarization efficiency of the atmosphere between a polarized radiation source and the reference is calculated. The dependence of specular reflectivity on incident angle and polarization of the incident radiation is used to determine stereo information from radiation returned from the reference (such as the photoluminescence emission intensity, or diffuse reflectance). Apparatus according to embodiments of the present invention is also used to determine three-dimensional shape information of remote objects, and spectroscopic information relating to an object surface may also be also obtained.

In embodiments of the present invention, a source of electromagnetic radiation with time-varying differential-polarization provides incident radiation that illuminates a remote object. Photoexcited emission (i.e., photoluminescence, Raman scattering, or diffuse reflection) is excited in the remote object, and time variations in photoluminescence intensity (or emission intensity) are used to form an image of the object. The time variations in photoluminescence intensity allow stereo vision information (i.e. three-dimensional information) to be determined for the object, and can be used to calculate a surface-height profile of the object from a single viewpoint. Photoluminescence spectra, regardless of whether the spectra are excitation and emission based, contain chemical information on the composition of points on the object. The difference between emission intensities at two polarization states, divided by the time-averaged emission intensity, is sensitive to the three-dimensional contours of the object. Therefore, the radiance of emission measured at the receiver is sensitive both to the three-dimensional contours of the object and to the orientation of the object.

The difference between photoluminescence intensities at the two incident radiation polarizations varies between one angle of incidence and another, hence varies at different incident points on a curved reference surface. The polarimetric photoluminescence signal is a function of time variations in emission intensity. The difference in photoluminescence intensities at two polarization states divided by the polarization-averaged photoluminescence intensity is designated the degree of polarization of the polarimetric photoluminescence signal. The degree of polarization of the polarimetric photoluminescence signal differs from the degree of polarization of emitted photoluminescence, which describes the polarization of emitted radiation.

The specular reflectance of the object varies with the polarization of the incident radiation, because incident radiation that is removed by specular reflection is not available to become photoluminescence emission, as described in Miyazaki et al., "Determining surface orientations of transparent objects based on polarization degrees in visible and infrared wavelengths," J. Opt. Soc. Am. A 19, 687-694 (2004). Hence, the emission intensity is anti-correlated with the specular reflectance due to radiative transfer, related to the conservation of energy. Therefore, if the incident angle is greater than zero but less than a critical angle, and if the total intensity of incident radiation is constant in time, this intensity of emission will vary with the polarization of the incident radiation.

The photoluminescence carries information on the three-dimensional shape of the object, because specular reflectance varies with incident angle as well as incident polarization. Surface curvature and changes in angle of incidence are thus embedded in the time variation of emission intensity. However, if the three-dimensional structure of the target surface and the distance to the target is determined a priori on a reference object, the response of the photoluminescence to incident radiation can be used to determine the strength of depolarization of the medium (i.e., atmosphere or water). Therefore, if the object has a curved or bent surface, the photoluminescence across the surface varies with position. This invention concerns the use of polarization measurements in photoexcited emission or diffuse reflection to determine depolarization of the medium.

In the case of a dielectric reference, the emission intensity varies with the linear polarization of the incident radiation. The Fresnel equations govern the specular reflectance of dielectric materials and indicate that the reflectance of s-polarized radiation is greater than reflectance of p-polarized radiation.

FIG. 1 shows a schematic of atmospheric depolarization efficiency measured by using a reference having photoluminescence, and incident radiation having time-varying degree of initial polarization. Electromagnetic radiation from a radiation source 10 passes through a polarization modulator 12 and excitation wavelength filter 14. The resulting incident radiation then passes through an environment, in this example the atmosphere, and is incident on the outer surface of a reference object (or more concisely, a reference) 16. FIG. 1 shows the incident radiation, I, incident at an incidence point 18 on the reference 16, and also shows a dashed line representing the tangent to the surface at the incidence point. A specular reflection beam is shown as R, and a transmitted beam (T) is transmitted into the reference and may be completely absorbed. Photoluminescence emission P, induced by the incident radiation, is collected by a lens 20, passes through emission wavelength filter 22, and is incident on a detector 24, in this example a camera. The wavelength filter 22 operates to separate the photoluminescence from reflected light.

Signal processing circuitry 26 is in communication with the polarization modulator 12 and detector 24, so that detected photoluminescence intensity is correlated with incident polarization. The detector 24 is illustratively a camera producing an intensity image matrix for photoluminescence. Three-dimensional data relating to the object may be shown on display 28.

The incident radiation I has time-varying differential polarization, $P_0(t)$, where $P_0$ is an initial degree of polarization (before passing through the environment) and t is time, and constant polarization-averaged intensity. The incident radiation passes through the environment, in this example the atmosphere, where it is partially depolarized by atmospheric particles. The radiation incident on the surface of the reference has a degree of polarization $P(t+y/c)$, where $P(t)$ is degree of polarization on the reference surface, t is time that the laser pulse is emitted and y is the distance between laser and surface.

The reference is preferably an object having a known shape, such as a cylinder or sphere, or other shape having a known cross-section or a shape that may be approximated. The reference has a surface that produces photoluminescence on excitation by the incident radiation. For example, the reference may have an outer layer, such as a coating containing a luminescent substance. A laser radiation source operating at a wavelength that excites photoluminescence from the surface reference is well suited for this exemplary inventive methodology.

Photoluminescence emission is generated that has a radiance that varies with time and angle of incidence. The depth of modulation (i.e., emission intensity for one polarization state of excitation minus the emission state for the orthogonal state of polarization) is recorded by the system and depends on the angle of incidence, and so contains information on the degree of polarization, $P(t)$.

The time electronics stores the initial polarization $P_0(t)$ and the fractional change in emission intensity $P(t)$, and from this the total depolarization factor $P/P_0$ is calculated. From the distance, y, over which the depolarization occurs, the path-averaged depolarization efficiency can be calculated. The path-averaged depolarization efficiency is here defined as $\beta=[-\ln(P/P_0)]/y$.

Figure 2:
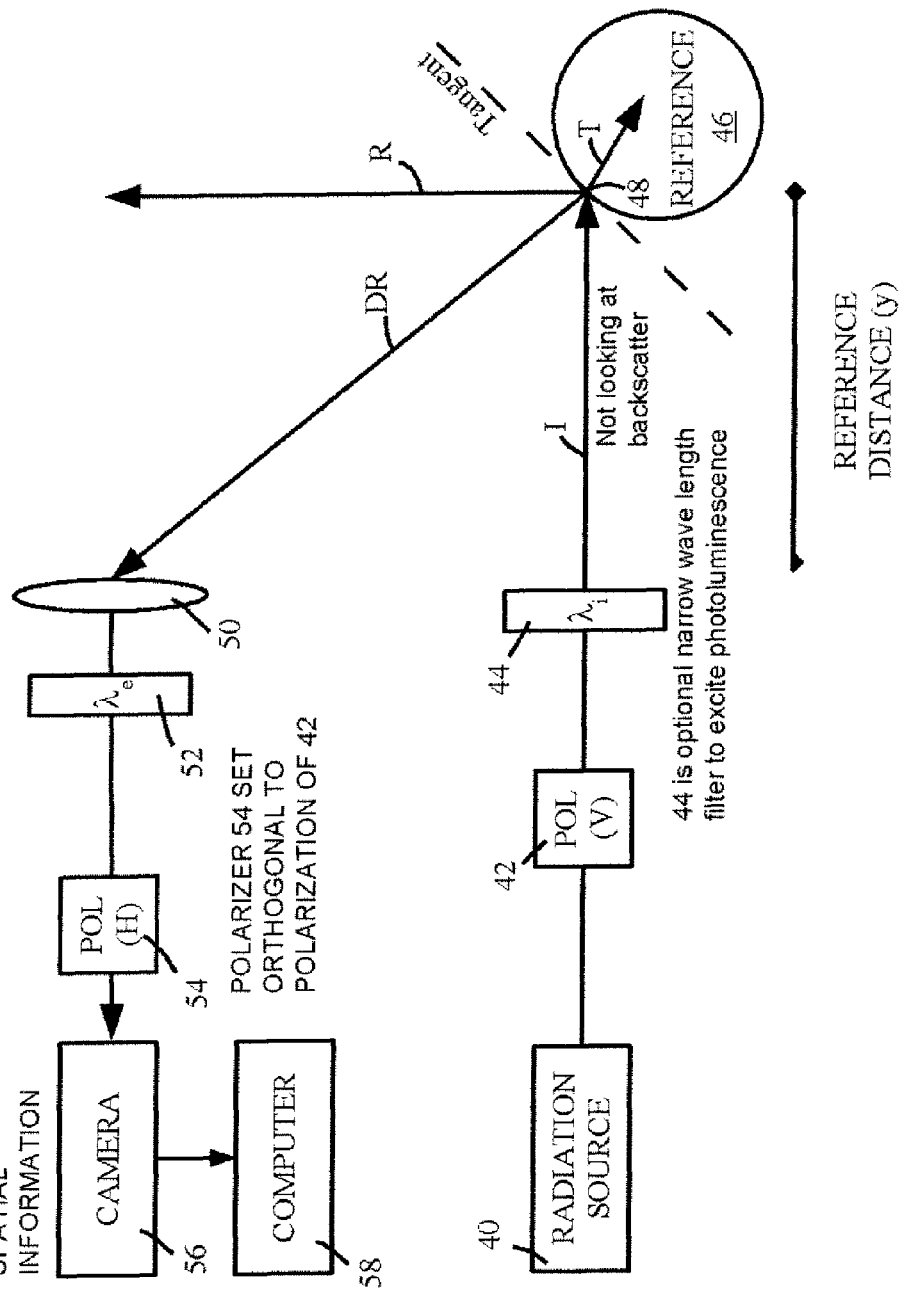
FIG. 2 shows a schematic of an apparatus used to determine depolarization efficiency of an environment using photoluminescence measurements and spatial variations in receiver intensity.

FIG. 2 shows the reference is a known three-dimensional shape, such as a cylinder or sphere, having an outer surface comprising a material producing both diffuse and specular reflectance at the wavelength, λ of the incident radiation. The electromagnetic radiation source in this example is a laser having a laser emission wavelength λ, and in this example the radiance of photoexcited emission or diffuse reflected radiation is measured using a laser beam having a constant (time-independent) intensity and polarization. In the case of photoexcited emission (photoluminescence or Raman), no polarizer is necessary on the camera receiver end because the photoexcited radiation is at a different wavelength than the transmitter radiation (i.e., $\lambda_i \neq \lambda_e$). However, in the case of diffuse reflected radiation, a polarizer on the receiver end is necessary to eliminate the specular reflected radiation because the photoexcited radiation is at the same wavelength as the transmitter information (i.e., $\lambda_i = \lambda_e$).

The narrow band filters on source and camera both pass the wavelength and absorb other wavelengths. The path-averaged depolarization efficiency can be calculated using the distance, y, over which depolarization occurs in the environment, in this case between the radiation source and the reference. In this example, the laser beam is fully polarized in the vertical direction. Diffuse reflection (scattered radiation) from the reference is imaged and filtered by the analyzer 54 set orthogonal to the polarization of the laser. In this example the analyzer has a horizontal orientation (out of the plane of the paper) so that the specular reflection is blocked. In this context, an analyzer is a polarizer within the receiver. From the variation of intensity of the diffuse reflectance on the image, the polarization state of the incident radiation can be calculated. Using the polarization state on the object, and the distance y between object and source, the depolarization efficiency β can be calculated.

A technique using the following mathematical procedure can be applied to the examples shown in FIG. 1 and FIG. 2. The procedure is based on a novel polarimetric equation which describes the photoexcited emission, at a specific emission wavelength, from an ideal surface:

$$\rho = \cos^2(\theta - \arccos(m^{-1}\sin\theta))\cos^2(\phi-\psi) + \sin^2(\phi-\psi)$$

where ρ is the depolarizance of the surface of the reference object, m is the index of refraction of the object, ψ is an angle of transmitter polarization, θ is the angle of incidence, and φ is the azimuthal angle. The method is based on the idea of measuring the luminescence at least two different times. One time would be when $\phi-\psi=0°$, and the other time when $\phi-\psi=90°$. Based on this equation, the following method can be shown for the determination of D. The depolarization efficiency, D, can be determined by the following equation, $$P = P_0 \exp(-Dy)$$

where, $$P_0 = 2(1-\rho_0)/(1+\rho_0),$$

$$\rho_0 = \cos^2(\theta - \arccos(m^{-1}\sin\theta)),$$

and $$P = L_2/L_1,$$

where $L_1$ is the luminescence intensity measured when $\phi-\psi=0°$ and $L_2$ is the luminescence intensity measured when $\phi-\psi=90°$. However, P is calculated differently for the two cases in FIG. 1 and FIG. 2. The measured luminescence in both cases is described by a function $L(\psi;\phi,\theta,y)$ where L is the luminescence intensity. In the case of FIG. 1, ψ varies with time, t. The intensity L is measured at various times, t. The other angles (φ and θ) are fixed during the determination. The polar angle, θ, must be known previous to the determination. The polarization for this case is, $$P = L(\phi;\phi+90°,\theta,y)/L(\phi;\phi,\theta,y),$$

The angle φ may be known before the determination of D. However, a variation on the technique would be that the angle φ be determined from the values measured of L at various times, t. In the case of FIG. 2, φ varies with the position on the object. The other angles (ψ and θ) are fixed during the determination. The angles, ψ and θ, must be known and fixed to the determination. The polarization for this case is, $$P = L(\psi;\psi+90°,\theta,y)/L(\psi;\psi,\theta,y).$$

The above method will work for photoluminescence emission, Raman scattering or diffuse reflection. D can be calculated in the case of FIG. 1 if the polarization varies with time. D can be calculated in the case of FIG. 2 when the polarization is constant in time.

The total polarization of the received light at distance z, which includes the depolarization of the atmosphere, is $P_f$ where $$R_f = \rho_d/\rho.$$

The strength of depolarization, D, of the medium between transmitter and receiver is calculated using the following formula.

$$R_f = \exp(-Dy).$$

Reference

The reference object, also referred to more concisely as a reference, may be a natural or man-made object. For example, a reference may be positioned a certain distance from the apparatus by placement, firing a projectile, dropping from an aircraft, or other method, at the time of measurement or at some earlier time. The reference may include an electronic circuit or transponder, so as to facilitate determination of the reference object distance. In other examples, a locator device may be placed on a natural object. The reference can be an object chosen to have desired properties, such as photoluminescence or diffuse scattering. The reference can be an object presenting a curved surface, for example providing a plurality of incident angles for incident radiation.

Reference Distance

The reference distance is the path length of the incident radiation through the environment to the point of incidence on the reference. For atmospheric depolarization determination, the reference distance may be much larger than the dimensions of the apparatus used, and may also be much larger than the size of the reference object. Hence, the reference distance may be equivalently referred to as, for example, the distance between the radiation source and the center of the reference object, without any significant loss of accuracy. For other media, or with shorter path lengths, determining the position of the point of incidence on the reference object is used in order to confirm the path length.

The reference distance may be determined by satellite imaging, a ranging device (such as laser ranging device, ultrasound ranging device, optical rangefinder, and the like), relative absolute position as determined using a GPS or similar device, from the angle subtended at the apparatus location (for an object of known size), apparent object position relative to known landmarks, or any other distance measurement method. The apparatus may include additional functionalities related to reference distance determination, such as ranging devices, wireless transceiver in communication with the reference (if appropriate), and the like. For example, the radiation source is optionally a pulsed laser, so that ranging can be achieved using gating times.

The reference distance can be determined using photometry, such as photometric stereo measurements using a color camera.

Transmitter

The transmitter provides incident radiation having desired properties. The transmitter comprises at least one radiation source, such as a laser, and optionally includes additional components to modify the properties of the incident beam, such as one or more lenses, an aperture, a polarizer or polarization modulator, a filter, and the like. The transmitter also optionally includes beam steering components to select an incidence location on a reference. Other possible transmitters include lamps and light emitting diodes.

The incident wavelength may be varied, for example by selecting one of a plurality of radiation sources, tuning a radiation source (such as a dye laser or wavelength adjustable semiconductor laser), or modifying or changing a filter.

The radiation source may be a directional source of electromagnetic radiation such as a laser providing laser radiation. The laser radiation is inherently polarized, or alternatively is polarized by an external polarizer. The laser radiation polarization is controllable by electrical signals applied to the laser, for example applied to an electrooptic material within the laser structure. Electrical signals are applied to a laser, such as a semiconductor laser structure, to control polarization and/or emission wavelength.

A polarization modulator, if used, may be an electrooptic modulator, for example comprising an electrooptic crystal. In other examples, the function of a polarization modulator is included in a laser. For example, a laser, such as a semiconductor laser, is optionally used having a laser radiation output having electrically controllable polarization properties.

Receiver

The receiver comprises the detector and any associated components, such as a lens or filter, are used to collect and detect the returned radiation.

Returned radiation from the reference, such as photoluminescence or diffuse reflection, is collected by the receiver. The receiver includes a detector, such as an optical detector. The receiver is sensitive to at least one spectrum of: visible wavelengths, IR wavelengths (including near-IR and thermal radiation wavelengths), THz, GHz, or other electromagnetic radiation ranges. For example, the receiver is sensitive to near-IR wavelengths and visible, or UV-visible ranges. For diffuse reflected radiation, a polarizer at the receiver end is used to eliminate specular reflected radiation from the receiver.

It is appreciated that the returned radiation also is optionally Raman scattering. Holographic filters in the receiver are used to selectively transmit Raman scattered radiation.

Signal Processing Circuitry

Apparatus according to the present invention preferably includes signal processing circuitry, operational to determine the depolarization of the environment from the initial polarization, the final polarization, and the reference distance. The signal processing circuitry allows the detector signal to be correlated with the polarization modulator, if used, or equivalently with the polarization output of the radiation source if this is controllable. The signal processing circuitry operates on a computer, the computer including a processor, clock, memory, data input, and data output (such as a display driver coupled to a display or transmitter in communication with a network). The processor may execute one or more algorithms to provide the results of calculations described herein.

Environment

In examples discussed above, the environment discussed is the atmosphere. However, examples of the present invention can be used to determine depolarization of various media, such as other gases, liquids (such as water, including river water and sea water), and solids, such as glasses.

Other Exemplary Apparatus

The transmitter and receiver may be disposed within a single housing, to form a unitary apparatus. The apparatus is carried or otherwise supported by a land vehicle, boat, submarine, aircraft, satellite, a person, or may be set on the ground, for example using a stand.

The apparatus optionally includes a display, which may be used to provide a visual indication of determined data. The display also is useful to show the part of the environment towards which the incident radiation is directed, for example in combination with zoom or image enhancement capabilities, in order to direct the incident radiation onto the surface of the desired reference. A camera optionally is used to image the reference object, the same camera being used as a sensor in the receiver, and/or for photometric stereo measurements.

In other inventive embodiments, the transmitter and receiver are contained in separate housings, and are in data communication through a cable or wireless communications link. It is appreciated that multiple transmitters and/or receivers optionally are used, for example to allow data to be collected for multiple angular positions, wavelengths, reference distances, and the like.

An apparatus according to an embodiment of the present invention optionally provides for collection of other ambient condition data, such as temperature, pressure, humidity, other meteorological conditions such as cloud cover or precipitation, time, sun position, pollutant analysis, particulate form and concentration, altitude, position (for example, using a GPS), and the like. Atmospheric depolarization may be correlated with ambient conditions, and may be used to interpret data collected under similar conditions.

An apparatus also optionally includes an operational mode selector, the operational mode selector having a first setting in which photoluminescence is detected, and a second setting in which diffuse reflection is detected.

An apparatus also optionally includes a data input, which can be the data input of the computer, the data input receiving the object distance so as to allow determination of the depolarization efficiency.

Ambient condition data is collected by instrumentation included within the device, received directly from other devices over a communications link, or may be entered by an apparatus operator using a data entry mechanism.

The apparatus also optionally includes a housing, which in some examples may seal against ingress of the environment under test (for example, if the environment is water, such as seawater). The housing may be provided with one or more windows to allow radiation to enter and/or leave the housing.

As used herein the terminology "photoluminescence" or "photoluminescent radition" refers to a process in which a substance absorbs photons (electromagnetic radiation) and then re-radiates photons. Quantum mechanically, the process can be described as an excitation to a higher energy state and then a return to a lower energy state accompanied by the emission of a photon. The photoluminescent processes include, but are not limited to, resonant radiations, in which a photon of a particular wavelength is absorbed and an equivalent photon is immediately emitted.

In general, the present invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims. Patents, patent applications, or publications mentioned in this specification are incorporated herein by reference to the same extent as if each individual document was specifically and individually indicated to be incorporated by reference. Having described the invention, the invention is now claimed.

The invention claimed is:

1. An apparatus for determining a depolarization efficiency of an environment comprising:
   a transmitter having a radiation source illuminating the reference object with incident radiation, the reference object being located in the environment a reference distance from the transmitter, the incident radiation having an initial polarization as the incident radiation enters the environment; the incident radiation causing the reference object to emit photoluminescence; the emission of the photoluminescence being dependent upon the change in polarization induced by the environment over the reference distance;
   a receiver, having a detector, receiving returned radiation from the reference object, the return radiation comprising photoluminescent radiation, the detector providing detector data correlated with at least one property of the photoluminescent radiation;
   signal processing circuitry, receiving the detector data from the detector, the signal processing circuitry being operational to determine the effect of the environment on the polarization of the electromagnetic radiation as measured by the change in degree of polarization per unit length over the reference distance based upon the initial polarization and the photoluminescent radiation.

2. The apparatus of claim 1 wherein the intensity of the photoluminescent radiation is dependent upon the polarization of the incident radiation, such that if the polarization of the incident radiation is changed by the environment, the intensity of the luminescent radiation changes to thereby indicate the depolarization caused by the environment.

3. The apparatus of claim 1 wherein the property of the photoluminescent radiation detected by the detector comprises intensity at one or more specified wavelengths.

4. The apparatus of claim 1 wherein the property of the photoluminescent radiation detected by the detector is polarization and wherein the intensity of the photoluminescent radiation is dependent upon the polarization of the incident radiation, such that if the polarization of the incident radiation is changed by the environment, the intensity of the photoluminescent radiation changes to thereby indicate the depolarization caused by the environment.

5. The apparatus of claim 1, wherein the radiation source is a laser and the reference object comprises a curved surface.

6. The apparatus of claim 1, wherein the detector is a camera for detecting spatial information for detecting changes in the intensity of polarization over the surface of the reference object.

7. The apparatus of claim 1, wherein the transmitter further comprises a polarization modulator to provide the initial polarization with a time dependence.

8. The apparatus of claim 4, wherein the signal processing circuitry is in electronic communication with the polarization modulator and with the detector.

9. The apparatus of claim 1, wherein the receiver comprises a filter which selectively transmits the photoluminescence at at least one predetermined wavelength.

10. The apparatus of claim 1, further comprising a distance measurement device operable to determine the reference distance.

11. The apparatus of claim 9, wherein the distance measurement device is a photometric device comprising one of a camera or laser pulse timing.

12. The apparatus of claim 1, wherein the receiver further comprises a lens and a narrow-band wavelength filter.

13. The apparatus of claim 1, wherein the reference object is a man-made object having a curved surface.

14. The apparatus of claim 1, wherein the reference object is a landscape feature.

15. The apparatus of claim 1, wherein:
   the transmitter further comprises a polarizer,
   the receiver further comprises an analyzer,
   the polarizer and analyzer have orthogonal orientations, and
      the returned radiation comprises diffuse reflectance occurring due to the properties of the surface of the reference object.

16. A method of determining the effect of an environment on the polarization of electromagnetic radiation as measured by the change in degree of polarization over a predetermined distance, the method comprising:
   providing incident radiation, the incident radiation having an initial polarization as the incident radiation enters the environment;
   directing the incident radiation onto a reference object; the incident radiation causing the reference object to emit photoluminescence; the emission of the photoluminescence being polarization dependent;
   analyzing-the photoluminescence emitted from the reference object;
   determining the change in degree of polarization induced by the environment over the predetermined distance based upon the initial polarization and the photoluminescence.

17. The method of claim 16, wherein the initial polarization has a time-dependent modulation.

18. The method of claim 16, wherein the provided incident radiation is laser radiation.

* * * * *